Feb. 17, 1953     G. H. SHOEMAKER     2,629,039
SELENIUM CELL AND PROCESS FOR MANUFACTURING THE SAME
Filed June 7, 1950

INVENTOR:-
George H. Shoemaker,
BY Pierce, Scheffler & Parker,
ATTORNEYS.

Patented Feb. 17, 1953

2,629,039

UNITED STATES PATENT OFFICE 2,629,039

SELENIUM CELL AND PROCESS FOR MANUFACTURING THE SAME

George H. Shoemaker, Brooklyn, N. Y., assignor to Weston Electrical Instrument Corporation, Newark, N. J., a corporation of New Jersey Application June 7, 1950, Serial No. 166,701

10 Claims. (Cl. 201—63)

This invention relates to selenium cells and to processes for manufacturing the same, and more particularly to selenium cells with selenium surfaces having novel characteristics and to processes for converting the selenium layers to crystalline form by molding, as distinguished from simple pressing, operations.

The conventional practice has been to apply the selenium to the heated electrode or disk by a spreading process and, after the coated disk is cooled, to effect the conversion of the selenium from amorphous to crystalline condition by a two-step process; the first step being a heat treatment for several hours at about 90° C., and with the selenium-coated disk held under pressure by compression springs, and the second step being a heat treatment for several hours at an annealing temperature of approximately 180° C. After annealing, the surface of the selenium is of grayish color and minutely roughened, resembling a finely etched plate. The cells were completed for use as contact rectifiers by spraying a metal layer upon the annealed selenium surface, or for use as photoelectric cells by sputtering a transparent conductive film or outer electrode upon the selenium surface. Various combinations of temperatures and pressures have been proposed as two-step or multiple-step processes to reduce the total time required for the conversion of the selenium from its inert vitreous state to an operative crystalline state but, so far as is now known, the selenium surfaces obtained by all prior processes were of the characteristic gray color of crystalline selenium.

Objects of the present invention are to provide selenium cells, and processes for the manufacture of selenium cells, having a selenium surface of novel physical characteristics. Objects are to provide selenium cells, and processes for the manufacture of selenium cells, with selenium surfaces which are black, specular and free from minute fissures or substantial craze. An object is to provide a molding process for the rapid conversion of a selenium layer to crystalline form under a substantially constant temperature; the process being characterized by a sharp increase in the molding pressure over a short period of about a minute during which crystallization is accelerated by the increasing pressure. An object is to provide a process for manufacturing selenium cells, which process includes the steps of imposing upon the back electrode and selenium a pressure sufficient to effect flow of the momentarily plastic selenium, increasing the applied pressure with time at an exponential rate for a short period to accelerate crystallization, and to maintain the entire mass of selenium under compression as it contracts with progressing crystallization, and then maintaining a heavy pressure for a short period to complete the conversion. An object is to provide a process, in the manufacture of selenium cells, for completing the conversion of the selenium layer of the cell to active crystalline condition in the short time interval of the order of two minutes. An object is to provide a process for the pressure molding of selenium-coated electrodes or disks in a heated press to effect a rapid conversion of the selenium to active crystalline form; the process comprising the steps of increasing the pressure rapidly for a short period and at such rate of accelerated crystallization that the physical appearance of the selenium-coated electrode on removal from the press and cooling affords an indication as to a proper, or alternatively, an unsatisfactory relation of pressure and time for effecting the desired conversion.

The crystallization of selenium spread upon a heated iron or nickel-clad iron electrode is initiated during the cooling of selenium-coated electrode, and it proceeds at a slow rate at atmospheric temperatures. The crystallization rate is accelerated by heat and pressure, but the characteristics of selenium obtained from different commercial sources, or obtained at different times from the same source, vary over a wide range and each purchased lot of selenium must be checked by the manufacture of a few pilot cells to determine its crystallization and other characteristics before it can be used in commercial manufacture. A particular advantage of the present invention is the quick conversion of the selenium layers of coated electrodes for pilot cells under conditions which, by physical inspection of the processed blanks, indicate immediately whether the process conditions are appropriate for that lot of selenium or should be varied.

Amorphous selenium has a specific gravity of about 4.2 and there is a large volume reduction of approximately 15% on complete conversion of the selenium to the crystalline state which has a specific gravity of about 4.8. This volume contraction has resulted in a cracking of the selenium surface into small concave surfaces separated by a web of fissures when the selenium was crystallized by some of the prior processes. A limited cracking of the selenium surface is not objectionable when the selenium cell is to be used as an alternating current rectifier, but it can not be tolerated when the selenium-coated blank is to be finished as a photoelectric cell since the transparent film electrode which is sputtered upon the selenium will not enter into or extend continuously across the fissures to form a grid of low electrical resistance.

Amorphous selenium becomes a viscous fluid when quickly heated to 90° C., but soon becomes pasty as a result of progressive crystallization. It is possible that a selenium layer could be converted to the crystalline state at a progressively accelerated rate, and without applying pressure to preclude fissures, by appropriate temperature increments until the crystallization is substantially complete.

In accordance with this invention, however, the crystallization is effected under pressure and at a substantially constant temperature of the order of 180° to 200° C., and preferably a temperature of 195°±5° C., and the applied pressure is increased at such a rate that the selenium is forced to flow to prevent fissures as the volume of the selenium contracts with progressive crystallization.

The initial pressure imposed upon the selenium which is quickly heated to about 195° C. may be of the order of 200 to 400 pounds per square inch, and it effects a momentary flow of the selenium before the accelerated crystallization resulting from the applied pressure converts the selenium layer to a pasty or semi-plastic state. The initial pressure may be maintained constant for a fraction of a minute, or it may be immediately increased exponentially to accelerate crystallization and to compress the selenium to prevent lateral tensile stresses which would develop crazing or fissures. The applied pressure may be increased substantially exponentially until crystallization is completed or, with due regard to practical apparatus for treating the selenium cell blanks, the pressure may be increased to a high level and then maintained constant until the conversion is completed.

The objects and advantages of the invention will be apparent from the following specification whe taken with the accompanying drawing in which.

The first step in the formation of a selenium cell may conform to the current practice of applying amorphous selenium to a sand-blasted steel or nickel-coated steel electrode which is heated on a hot plate to about 325° C. When the selenium melts, it is spread with a glass spatula to cover the surface of the electrode and, after spreading the selenium-coated electrode is removed from the hot plate and cooled to atmospheric temperature. Preferably, in accordance with the invention, the coated electrode is rapidly cooled upon a cold plate, and is transferred without material delay to a mold which is heated to a substantially fixed temperature of, for example 195° C. ± 5° C. The initial pressure as applied to the selenium-coated electrode in the heated mold is of a magnitude sufficient to produce a flow of the selenium at the mold temperature and a part of the selenium escapes around the edge of the electrode to form a "flash" coating on the rear face of the electrode. For a mold temperature of 195° C., an initial pressure of the order of 200 to 400 pounds per square inch is appropriate according to the characteristics of the particular lot of selenium.

Figure 1:
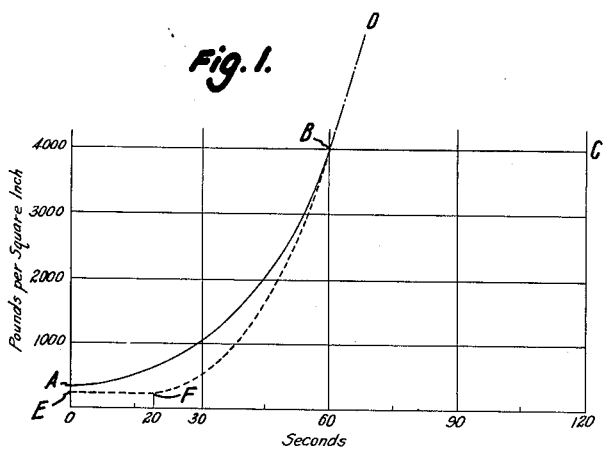
Fig. 1 is a curve sheet showing pressure-time relationships for different process embodiments of the invention.

The applied pressure accelerates the crystallization of the selenium layer and, in accordance with one process contemplated by the invention, the pressure is increased exponentially from about 300 pounds per square inch to about 4000 pounds per square inch, in a time interval of about one minute, as indicated by the solid line curve AB of Fig. 1. The exponential pressure increase prevents lateral tensile stresses in the selenium layer during the volume contraction which accompanies crystallization, and the complete conversion to crystalline state may be effected at the high pressure of about 4000 pounds per square inch and a temperature of 195° C. in about an additional 60 seconds, as indicated by curve section BC of Fig. 1.

The "dwell" period BC of constant pressure on the selenium layer is necessary when the apparatus for applying pressure to the selenium layer can establish only a definite maximum pressure as indicated by the horizontal section BC of the pressure-time curve of Fig. 1. With apparatus for increasing the pressure exponentially to higher levels, as indicated by broken line BD of Fig. 1, the time interval for complete formation of the selenium layer to the crystalline state may be reduced to substantially less than the two minute interval indicated by curve ABC.

A variation of the process which may be employed with selenium-coated electrodes, and which is particularly adapted to a molding process in which the electrode and pellets or wafers of selenium are inserted in the molding press, is indicated by curve EFBC or curve EFBD of Fig. 1. The pressure initially applied to the selenium wafer and electrode assembly or to a selenium-coated electrode may be about 200 to 300 pounds to the square inch and it is maintained constant for about 15 to 20 seconds to melt the selenium wafer and effect the conversion of a substantial fraction of the selenium mass to crystalline form, as indicated by line EF, and is then raised substantially exponentially as indicated by line FB, during the more rapid crystallization of the selenium layer. The complete conversion may take place according to pressure-time relations as shown by curve section BC or BD.

Figure 2:
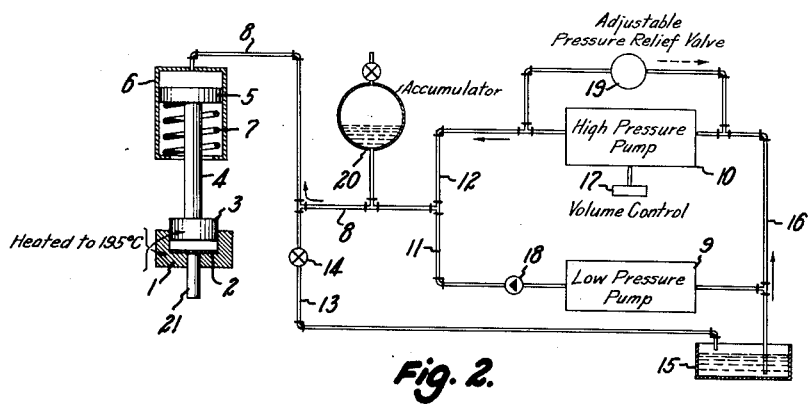
Fig. 2 is a schematic diagram of pressure molding apparatus for carrying out the forming of the selenium material in accordance with the invention.

Apparatus for carrying out the processes of the invention is shown schematically in Fig. 2. A heated mold 1 in which the coated electrode 2 is snugly received has a die or pressure member 3 on a rod 4 of a piston 5 in a pressure cylinder 6. A spring 7 or equivalent means raises the piston 5 to open the mold press in the absence of an applied fluid pressure. Fluid pressure is applied to the mold press through a pipe line 8 into which a low pressure pump 9 and a high pressure pump 10 of adjustable volume output are connected in parallel by lines 11, 12 respectively. A by-pass line 13 with a manually controlled valve 14 is connected to the pressure line 8 and discharges into an oil or liquid sump 15 from which the pumps 9, 10 draw liquid through a supply line 16. The low pressure pump 9 is of large volume or capacity and serves to close the mold press when the by-pass valve 14 is closed. The high pressure pump 10 is of lower capacity and includes means adjustable by a volume control knob 17 to regulate the output volume. A check valve 18 is provided in the output line 11 of the low pressure pump 9, and an adjustable pressure relief valve 19 is by-passed around the high pressure pump 10 to limit the output pressure of pump 10 to a preselected maximum value. An accumulator or air bell 20 is connected to the feed line 8 to the molding press, and the accumulator is so designed that the hydraulic pressure established upon the piston 5 by the high pressure pump 10 increases substantially exponentially.

On closure of the valve 14, the low pressure, high volume pump 9 sets up a pressure in line 8 to close the mold press, and the high pressure, adjustable volume pump 10 also discharges into line 8, through line 12, to raise the hydraulic pressure on the piston 5 at an exponential rate determined by the accumulator 20 and the adjustment of the volume control element 17 of the high pressure pump 10. The check valve 18 in the low pressure pump line 11 closes after a short interval as the pressure in line 8 quickly rises above the maximum discharge pressure of pump 9, and the pump 9 runs idly during the remainder of the cycle. Valve 14 is opened at the close of the molding operation and the pressure fluid drains to the sump 15 through line 13. The press plunger is lifted by the spring 7 on removal of the hydraulic pressure, and the formed cell blank 2 is ejected from the mold 1 by means of a knock-out pin 21.

The crystallization of the selenium is complete or substantially complete when the selenium-electrode assemblies are removed from the press, and it is not necessary to age or anneal the assemblies before collector rings and/or electrodes are applied to complete the selenium cells.

The die or press plunger 3 is preferably of stainless steel, and its lower surface is highly polished except for a minutely roughened or etched band around the outer edge. The selenium over the central area 22 of the blank therefore has a black specular surface resembling a "black mirror," whereas the selenium at the border 23 of the blank is minutely roughened and of a somewhat grayish color; see Fig. 3. The selenium is heated and softened by contact with the heated die or pressure member 3 and, under the initially applied pressure, some of the selenium escapes around the edge of the electrode 2 to form a "flash" coating 24 at the rear face of the electrode; see Fig. 4.

The relative extent and location of the flash coating 24 affords an immediate check upon the pressure-time relations at the initial stage of the molding operation. In general, a flash coating 24 which is continuous around the periphery of electrode 2, and which does not cover the entire rear surface of the electrode is indicative of good molding conditions for that particular lot of selenium. The amount of selenium per cell area is so selected that the front face thickness of the molded selenium layer is about 0.004 to 0.006 inch, but the absolute front-face thickness is not critical and the amount of selenium employed is closely regulated primarily for the purposes of checking the molding conditions by inspection of the flash coating at the rear face of the electrode and of establishing uniform pressure molding conditions when a plurality of selenium-electrode assemblies are simultaneously processed in a molding press. If the flash coating covers the entire rear surface, the initial pressure should be reduced and/or should be maintained constant for a short interval, as indicated by pressure line EF of Fig. 1, before the pressure is increased exponentially. This dwell period of constant initial pressure for some 15 to 20 seconds may be obtained by placing a valve in the pressure line 12 from pump 10, and opening the valve at a desired time delay after the closing of valve 14. Another method of preventing excessive flashing is to age the selenium-coated electrodes for several hours, thereby effecting an initial slow-rate crystallization, before they are placed in the molding press. If the flash of a pilot cell blank from a new lot of selenium is not continuous around the edge of the blank, the initial pressure should be increased or, if that is not practical with the particular mold press equipment, the lot of selenium should be mixed with another lot of less rapid crystallization characteristics.

Figure 3:
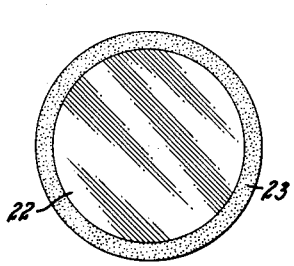
Fig. 3 is a plan view of the selenium-coated electrode as it appears when removed from the mold.
Figure 4:
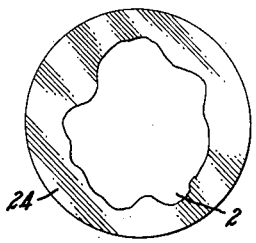
Fig. 4 is a view of the back surface of a selenium-coated electrode removed from the mold.

A second empirical check upon the pressure-time relations for a new lot of selenium is afforded by inspection of the central area 22 of the blank on removal from the molding press. The central active area 22, Fig. 3, is continuous and planar when the molding pressure is increased at a rate which is at least proportional to the accelerating crystallization and prevents lateral tension stresses in the selenium layer. Some minute or incipient crazing of the specular surface of the selenium is permissible with selenium-coated blanks which are to be completed as photoelectric cells, but a cracking of the selenium surface into a block pattern of concave surfaces indicates that the molding pressure should be increased at a more rapid rate. Crack development upon cooling after removal of the processed blank is evidence of incomplete conversion and indicates that the blank should have been held under pressure for a longer period.

Figure 5:
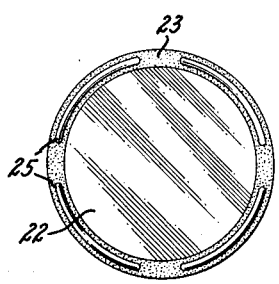
Fig. 5 is a plan view of a completed cell of photoelectric type.

Although cracking of the selenium surface is not as objectionable in the case of rectifiers as it is when the selenium-coated electrodes are to be completed as photoelectric cells, it is preferable to form the blanks for both rectifiers and photoelectric cells with planar, non-fissured surfaces. For photoelectric cells, a collector electrode 25 which may be an annulus, or as shown, a series of arcuate segments, is spray deposited on the roughened outer rim section 23 of the molded selenium-coated electrode blank, see Fig. 5, and a transparent outer electrode layer or grid, not shown, is then sputtered upon the collector electrode 25 and the active black specular surface 22 of selenium.

It is to be understood that the invention is not limited to the particular temperature-pressure-time relationships herein specified since a variation of any one of the related control conditions for accelerated crystallization of selenium will result in a variation of the associated control conditions. It is basically new, so far as is now known, to mold selenium-coated electrodes under a pressure which effects a momentary plastic flow of the selenium and is then increased substantially exponentially in proportion to an accelerating rate of crystallization of the selenium, thereby to produce a crystalline selenium layer having a non-fissured black specular surface; and various complementary changes in pressure and time conditions which may occur to those familiar with this art fall within the spirit and scope of the invention as set forth in the following claims.

I claim:

1. In the manufacture of a selenium cell, the process which comprises applying amorphous selenium to an electrode, and converting the amorphous selenium to crystalline selenium by the steps of heating the selenium-electrode assembly quickly to a temperature of the order of 180° to 200° C., substantially immediately imposing upon the so-heated selenium-electrode assembly an initial molding pressure sufficient to render the selenium momentarily fluent at the existing temperature, and increasing the pressure on the so-heated selenium-electrode assembly as the volume of the selenium contracts with progressive crystallization.

2. In the manufacture of a selenium cell, the invention as recited in claim 1, wherein the initially applied molding pressure is increased with time substantially exponentially.

3. In the manufacture of a selenium cell, the invention as recited in claim 1, wherein the initial molding pressure is maintained substantially constant for an interval of the order of a fraction of a minute.

4. In the manufacture of a selenium cell, the invention as recited in claim 1, wherein the pressure is increased within a period of the order of 45 to 60 seconds from an initial pressure of the order of 200 to 400 pounds per square inch to a relatively high value of the order of 10 times the initial pressure, in combination with the step of maintaining the mold pressure upon the selenium-electrode assembly at said relatively high value for a time interval sufficient to complete the crystallization of the selenium.

5. In the manufacture of a selenium cell, the one-stage process of completely converting amorphous selenium to the crystalline state which comprises quickly heating a selenium-electrode assembly to a temperature of the order of 180° to 200° C., facilitating crystallization of the selenium, and imposing upon the heated assembly a pressure which increases substantially exponentially with time for a period of the order of from 45 to 60 seconds and from an initial value sufficient to effect a momentary flow of the selenium.

6. In the manufacture of a selenium cell comprising a selenium-electrode assembly, the process of completely converting the amorphous selenium to the crystalline state under constant temperature and varying pressure which comprises the steps of quickly heating the assembly to a preselected temperature at which amorphous selenium is semiplastic, imposing upon the heated assembly a pressure effecting momentary flow of the selenium, and increasing the applied pressure with progressive crystallization and accompanying volume contraction of the selenium to prevent lateral tensile stresses in the selenium, thereby to prevent the formation of fissures in the surface of the selenium and to impart thereto a black specular surface.

7. A selenium cell blank comprising an electrode, and a crystalline layer of selenium on said electrode, said crystalline selenium layer having a black specular surface.

8. A selenium cell blank comprising an electrode, and a crystalline layer of selenium on said electrode, said crystalline selenium layer having a black specular surface within a surrounding band of crystalline selenium having a minutely roughened surface.

9. A selenium cell blank as recited in claim 8, in combination with a collecting electrode on said surrounding band.

10. A selenium cell blank comprising a nickel-coated ferrous electrode, and an adherent layer of crystalline selenium on said electrode; said selenium layer having a black specular surface.

GEORGE H. SHOEMAKER.

REFERENCES CITED

The following references are of record in the file of this patent:

UNITED STATES PATENTS

| Number | Name | Date |
| --- | --- | --- |
| 866,462 | Hammer | Sept. 17, 1907 |
| 2,186,085 | Wein | Jan. 9, 1940 |
| 2,196,830 | Hewlett | Apr. 9, 1940 |
| 2,342,278 | Herrmann | Feb. 22, 1944 |
| 2,364,642 | Miller et al. | Dec. 12, 1944 |
| 2,413,013 | Von Hippel | Dec. 24, 1946 |
| 2,433,401 | Saslaw | Dec. 30, 1947 |
| 2,479,301 | Blackburn et al. | Aug. 16, 1949 |

FOREIGN PATENTS

| Number | Country | Date |
| --- | --- | --- |
| 3,249 | Great Britain | of 1884 |

OTHER REFERENCES

Hinman et al.: Proceedings of the Institute of Radio Engrs., Dec. 1946, pp. 982–3.